(12) United States Patent
Foat et al.

(10) Patent No.: US 6,634,688 B2
(45) Date of Patent: Oct. 21, 2003

(54) METHOD FOR MOUNTING A VEHICLE JACK ON A MOTOR VEHICLE

(75) Inventors: Brent H Foat, Loretto (CA); Wayne Doswell, Richmond Hill (CA)

(73) Assignee: Ventra Group Inc., Bradford (CA)

( * ) Notice: Subject to any disclaimer, the term of this patent is extended or adjusted under 35 U.S.C. 154(b) by 24 days.

(21) Appl. No.: 10/082,215

(22) Filed: Feb. 26, 2002

(65) Prior Publication Data

US 2002/0084399 A1 Jul. 4, 2002

Related U.S. Application Data

(60) Provisional application No. 60/330,631, filed on Oct. 26, 2001.

(51) Int. Cl.[7] .............. B60J 9/00; B62C 1/00; B62D 23/00; B62D 39/00
(52) U.S. Cl. .......... 296/1.1; 254/424; 254/425; 248/506; 248/507; 224/42.4
(58) Field of Search ............ 296/1.1; 254/424, 254/425; 248/673, 309.2, 506, 507; 224/42.4, 545, 567, 568

(56) References Cited

U.S. PATENT DOCUMENTS

| | | | |
|---|---|---|---|
| 996,137 A | * | 6/1911 | Praeger |
| 1,714,464 A | | 5/1929 | Merriman |
| 1,994,015 A | * | 3/1935 | Curran |
| 4,055,329 A | | 10/1977 | Hammond |
| 4,111,344 A | | 9/1978 | MacDonald |
| 4,249,685 A | | 2/1981 | Sawby |
| 4,586,696 A | | 5/1986 | Mugford et al. |
| 4,750,774 A | | 6/1988 | Pickering |
| 4,838,512 A | | 6/1989 | Lisak et al. |
| 4,848,733 A | | 7/1989 | Yamauchi et al. |
| 5,104,170 A | | 4/1992 | Rich |
| 5,118,083 A | | 6/1992 | Metzen |
| 5,139,232 A | | 8/1992 | Bailey |
| 5,176,362 A | | 1/1993 | Seksaria et al. |
| 5,275,378 A | | 1/1994 | Alten |
| 5,346,180 A | | 9/1994 | Popowich |
| 5,364,072 A | | 11/1994 | Engel |
| 5,449,149 A | | 9/1995 | Popowich |
| 5,458,316 A | | 10/1995 | Engel |
| 5,893,494 A | | 4/1999 | Charton |
| 5,894,974 A | | 4/1999 | Jensen |
| 5,950,990 A | | 9/1999 | Castillo |
| 5,988,594 A | | 11/1999 | Gill |
| 6,070,856 A | | 6/2000 | Alten |
| 6,227,428 B1 | | 5/2001 | Lewis et al. |

* cited by examiner

*Primary Examiner*—D. Glenn Dayoan
*Assistant Examiner*—Scott Carpenter
(74) *Attorney, Agent, or Firm*—Pillsbury Winthrop LLP

(57) ABSTRACT

The present application discloses a method for mounting a vehicle jack in a stored position on a motor vehicle. The present application also discloses a combination of a vehicle and a jack stored on the vehicle, and a vehicle jack configured to be stored on a vehicle. Further, the present application also discloses a motor vehicle having an arrangement for retaining a vehicle jack thereon in a stored position.

6 Claims, 6 Drawing Sheets

METHOD FOR MOUNTING A VEHICLE JACK ON A MOTOR VEHICLE

The present application claims priority to U.S. Provisional Application Ser. No. 60/330,631, filed Oct. 26, 2001, the entirety of which is hereby incorporated into the present application by reference.

FIELD OF THE INVENTION

The present invention relates to a method for mounting a vehicle jack in a stored position on a motor vehicle. The present invention also relates to a combination of a vehicle and a jack stored on the vehicle, and a vehicle jack configured to be stored on a vehicle. Further, the present invention also relates to a motor vehicle having an arrangement for retaining a vehicle jack thereon in a stored position.

BACKGROUND OF THE INVENTION

Typically, vehicle jacks are retained in a secured position by a bracket that is fixed to a structural member of the vehicle by bolts or welding. In prior art brackets, a pivoting bar is mounted to the base. When the jack is disposed on the base in its stored position, the bar is pivoted so that it is adjacent to and extending across the load rest. The user then operates the jack's raising and lowering mechanism slightly so that the pivoting bar is tensioned. This secures the jack in its stored position between the pivoting bar and the jack base.

In the motor vehicle industry there is a consistent demand to reduce vehicle cost and weight. To meet this demand, OEMs and suppliers are looking for ways to reduce part count in existing components. Reduced part count typically leads to a decrease in cost, as less parts need to be manufactured and assembled, and a decrease in weight, as less parts typically mean less weight.

The present invention relates to vehicle jacks, and particularly to a method and arrangement for retaining a vehicle jack in a stored position on a structural member of a vehicle without the need for the intervening bracket. Eliminating the bracket is a desirable feature because it eliminates the both the weight and manufacturing and assembly costs associated with the bracket and the elements thereon for securing the jack thereto, such as the pivoting bar discussed above.

SUMMARY OF THE INVENTION

One aspect of the present invention provides a method for mounting a vehicle jack in a stored position on a motor vehicle without the use of an intervening bracket. In the method of this aspect of the invention, the jack comprises a plurality of assembled structures including (a) a load rest for engagement with an underside of the vehicle, (b) a base having a ground engaging surface for engagement with a ground surface below the vehicle, and (c) a raising and lowering mechanism having a drive element constructed and arranged to have an input force applied thereto. The raising and lowering mechanism is constructed and arranged to translate the input force applied to the drive element into upward and downward movement of the load rest relative to the base for affecting respective raising and lowering movements of the vehicle relative to the ground surface. At least one of the assembled structures has a recess formed on an edge portion thereof. The motor vehicle comprises a vehicle body including (a) a structural member to which the vehicle jack is to be mounted, (b) a mounting element having a post member extending directly from the structural member and a jack engaging surface extending from the post member and facing generally towards the structural member, the jack engaging surface and the post member at least in part defining a jack retaining space, and (c) a releasable jack retainer constructed and arranged to cooperate with the mounting element to retain the jack on the structural member.

The method of this aspect of the invention comprises positioning the jack in the stored position directly adjacent the structural member of the vehicle; positioning the edge portion in the jack retaining space such that the post member is received in the recess; and moving the jack retainer to a jack retaining position wherein the jack retainer engages another portion of the jack spaced from the edge portion to substantially prevent the jack from moving away from the mounting element to thereby maintain the edge portion in the jack receiving space. As a result, the jack engaging surface and the jack retainer cooperate to substantially prevent the jack from moving away from the structural member of the vehicle, and the jack retainer and the post member in cooperation with the recess substantially prevent the jack from moving generally parallel to the structural member.

Another aspect of the present invention provides a combination comprising a motor vehicle and a vehicle jack. The motor vehicle comprises a vehicle body including (a) a structural member, (b) a mounting element having a post member extending directly from the structural member and a jack engaging surface extending from the post member and facing generally towards the structural member, the jack engaging surface and the post member at least defining a jack retaining space, and (c) a releasable jack retainer movable between a jack retaining position and a jack releasing position. The jack comprises a plurality of assembled structures including (a) a load rest for engagement with an underside of the vehicle, (b) a base having a ground engaging surface with a ground surface below the vehicle, and (c) a raising and lowering mechanism having a drive element constructed and arranged to have an input force applied thereto. The raising and lowering mechanism is constructed and arranged to translate the input force applied to the drive element into upward and downward movement of the load rest relative to the base for affecting respective raising and lowering movements of the vehicle relative to the ground surface. At least one of the assembled structures has a recess formed on an edge portion thereof. The jack is positioned in a stored position adjacent the structural member of the vehicle with the edge portion in the jack retaining space such that the post member is received in the recess. The jack retainer is positioned in the jack retaining position thereof wherein the jack retainer engages another portion of the jack spaced from the edge portion to substantially prevent the jack from moving away from the mounting element to thereby maintain the edge portion in the jack receiving space. As a result, the jack engaging surface and the jack retainer cooperate to substantially prevent the jack from moving away from the structural member of the vehicle, and the jack retainer and the post member in cooperation with the recess substantially prevent the jack from moving generally parallel to the structural member. The jack retainer is movable to the jack releasing position wherein the jack retainer is disengaged from the another portion of the jack so as to allow the jack to be moved out of the stored position for use by (a) moving the jack generally parallel to the structural member so as to remove the edge portion from the jack receiving space and (b) moving the jack away from the structural member.

Yet another aspect of the present invention provides a vehicle jack configured for storage on a motor vehicle without the use of an intervening bracket. The vehicle comprises a vehicle body including (a) a structural member to which the jack is to be mounted, (b) a mounting element having a post member extending directly from the structural member and a jack engaging surface extending from the post member and facing generally towards the structural member, the jack engaging surface and the post member at least in part defining a jack retaining space, and (c) a releasable jack retainer movable between a jack retaining position and a jack releasing position. The vehicle jack comprises a plurality of assembled structures including (a) a load rest for engagement with an underside of the vehicle, (b) a base having a ground engaging surface for engagement with a ground surface below the vehicle, and (c) a raising and lowering mechanism having a drive element constructed and arranged to have an input force applied thereto. The raising and lowering mechanism is constructed and arranged to translate the input force applied to the drive element into upward and downward movement of the load rest relative to the base for affecting respective raising and lowering movements of the vehicle relative to the ground surface. At least one of the assembled structures has a recess formed on an edge portion thereof. The jack is constructed and arranged to be positioned in a stored position adjacent the structural member of the vehicle with the edge portion in the jack retaining space such that the post member is received in the recess to thereby enable the jack retainer to be positioned in the jack retaining position thereof wherein the jack retainer engages another portion of the jack spaced from the edge portion to substantially prevent the jack from moving away from the mounting element to thereby maintain the edge portion in the jack receiving space. As a result, the jack engaging surface and the jack retainer cooperate to substantially prevent the jack from moving away from the structural member of the vehicle, and the jack retainer and the post member in cooperation with the recess substantially prevent the jack from moving generally parallel to the structural member.

Yet another aspect of the invention provides a motor vehicle including an arrangement for retaining a jack thereon in a stored position thereon without the use of an intervening mounting bracket. The jack comprises a plurality of assembled structures including (a) a load rest for engagement with an underside of the vehicle, (b) a base having a ground engaging surface for engagement with a ground surface below the vehicle, and (c) a raising and lowering mechanism having a drive element constructed and arranged to have an input force applied thereto. The raising and lowering mechanism is constructed and arranged to translate the input force applied to the drive element into upward and downward movement of the load rest relative to the base for affecting respective raising and lowering movements of the vehicle relative to the ground surface. At least one of the assembled structures has a recess formed on an edge portion thereof. The vehicle comprises a vehicle body including (a) a structural member to which the jack is to be mounted, (b) a mounting element having a post member extending directly from the structural member and a jack engaging surface extending from the post member and facing generally towards the structural member, the jack engaging surface and the post member at least in part defining a jack retaining space, and (c) a releasable jack retainer movable between a jack retaining position and a jack releasing position. The jack retainer and the mounting element are arranged with respect to one another to enable the jack to be positioned in a stored position adjacent the structural member of the vehicle with the edge portion in the jack retaining space such that the post member is received in the recess. The jack retainer is constructed and arranged such that in the jack retaining position thereof the jack retainer engages another portion of the jack spaced from the edge portion to substantially prevent the jack from moving away from the mounting element to thereby maintain the edge portion in the jack receiving space. As a result, the jack engaging surface and the jack retainer cooperate to substantially prevent the jack from moving away from the structural member of the vehicle, and the jack retainer and the post member in cooperation with the recess substantially prevent the jack from moving generally parallel to the structural member. The jack retainer is constructed and arranged such that in the jack releasing position thereof the jack retainer is disengaged from the another portion of the jack so as to allow the jack to be moved out of the stored position for use by (a) moving the jack generally parallel to the structural member so as to remove the edge portion from the jack receiving space and (b) moving the jack away from the structural member.

Other objects, features and advantages of the present invention will become apparent from the following detailed description, the accompanying drawings, and the appended claims.

DETAILED DESCRIPTION OF THE INVENTION

Figure 1:
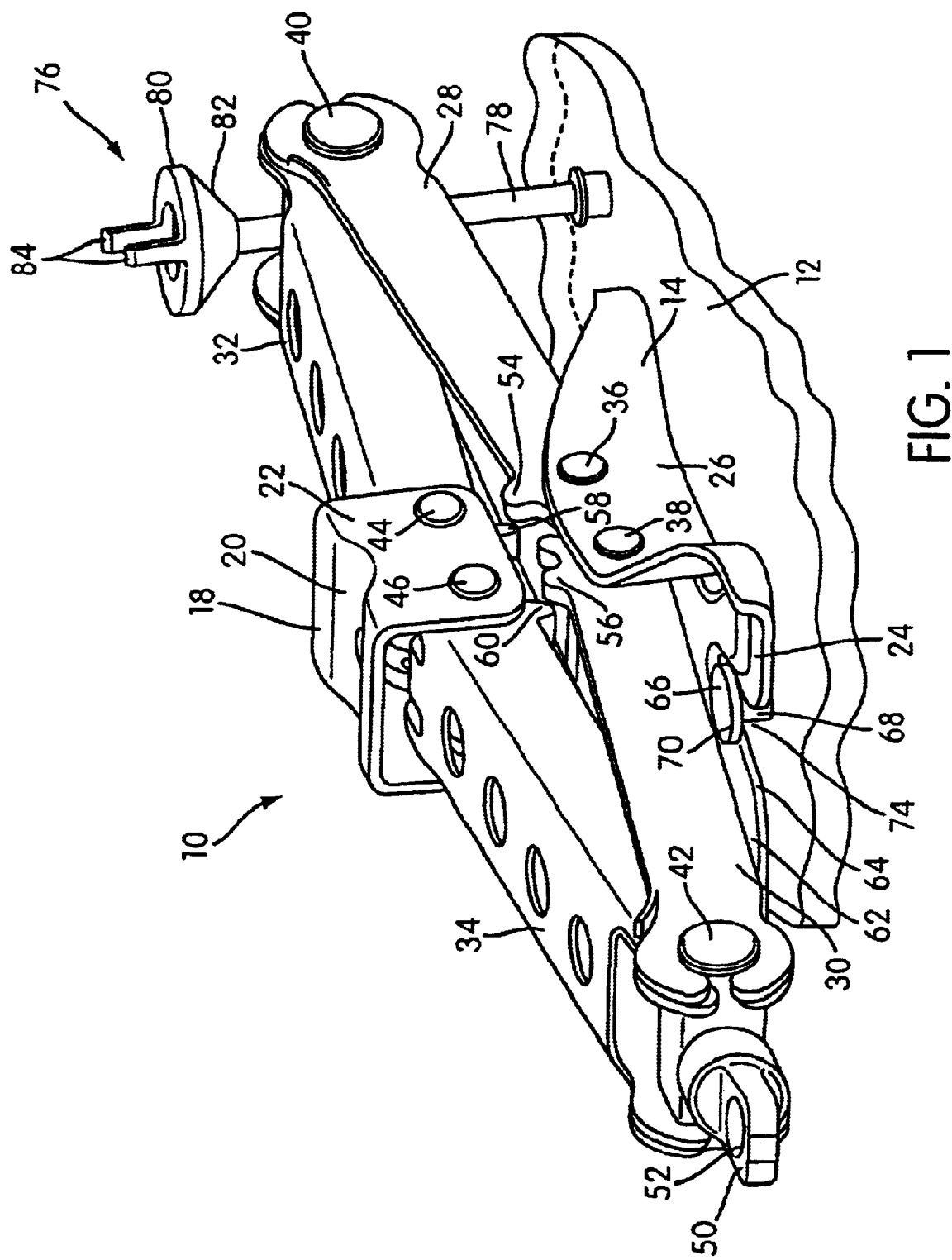
FIG. 1 is a perspective view of a vehicle jack mounted to a structural member of a motor vehicle in accordance with the present invention.
Figure 2:
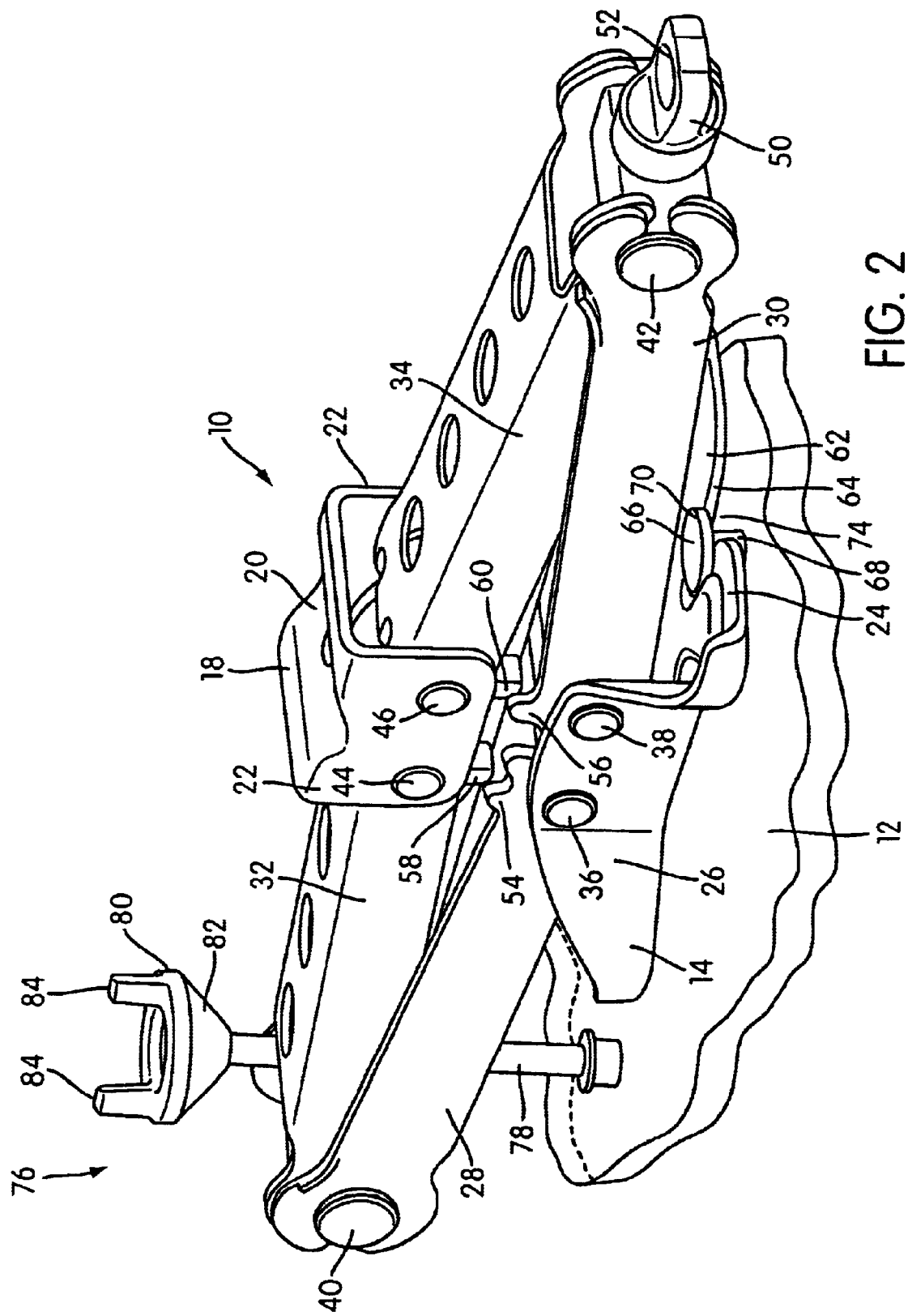
FIG. 2 is a perspective view of the vehicle jack of FIG. 1 taken from a different perspective.
Figure 3:
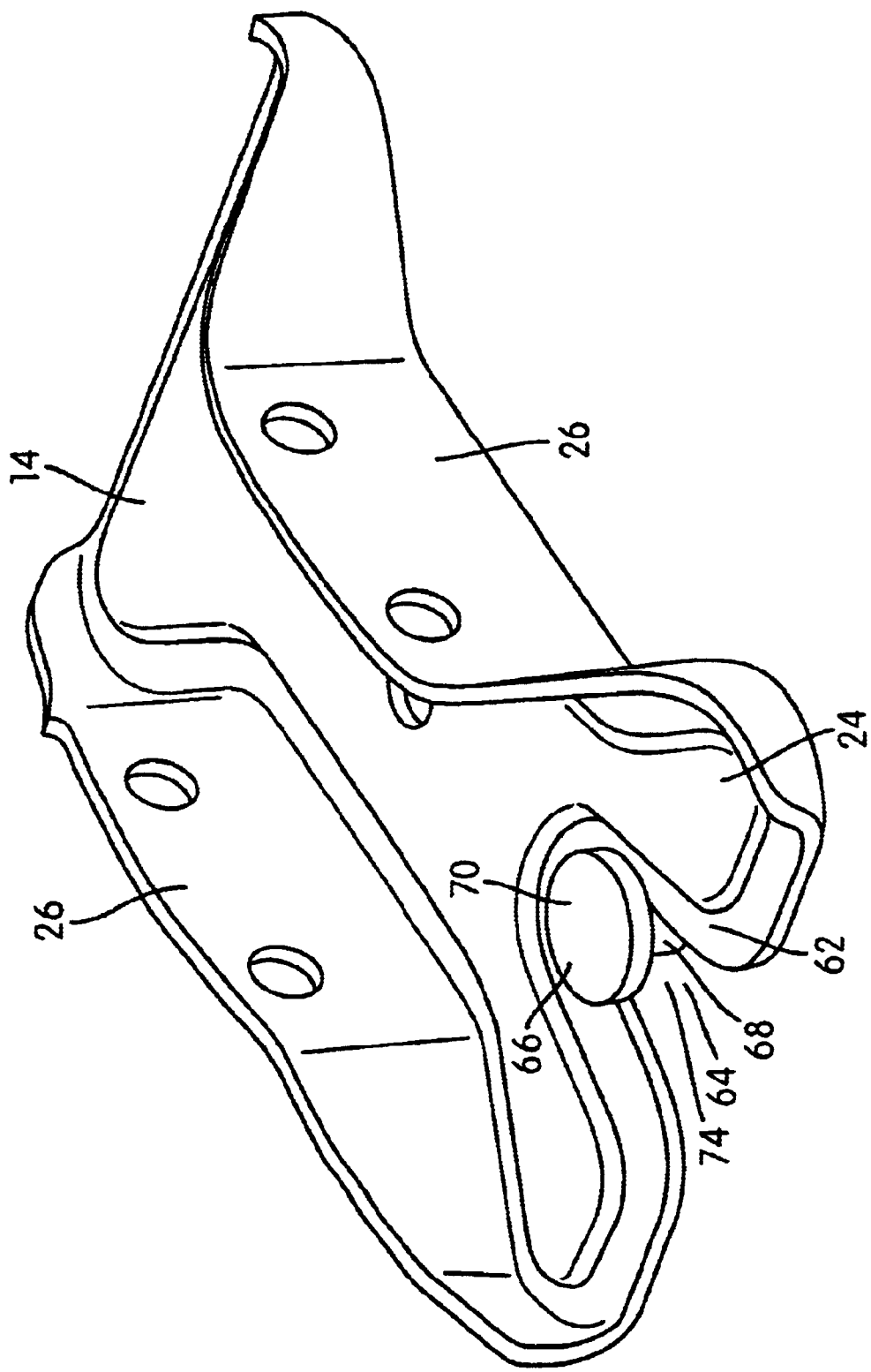
FIG. 3 is a perspective view of the mounting element and the base of the vehicle jack of FIG. 1 isolated from the structural member of the vehicle and the remaining components of the jack.

FIG. 1 is a perspective view showing a vehicle jack, generally indicated at 10, constructed in accordance with the principles of the present invention. The jack 10 is installed in a stored position on a structural member 12. The structural member 12 is part of a vehicle body, but is illustrated in isolation from the remainder of the vehicle for clarity purposes. The structural member 12 can be any structural member constituting a part of the vehicle body, including but not limited to, an interior floor pan of the passenger compartment, an interior wall of the passenger compartment, an interior floor pan or wall of a trunk compartment, or a floor pan or wall of a truck bed. In the context of the present invention, if the structural member has a protective or decorative layer thereon (such as the carpeting often used on a passenger compartment floor pan, padding/molding used on a passenger compartment wall, or bed liners in truck beds), the protective/decorative layer is considered to be part of the structural member 12. Thus, when an element is said to be engaged directly with or positioned directly adjacent the structural member, the protective/decorative layer should be considered part of the structural member 12.

Figure 4:
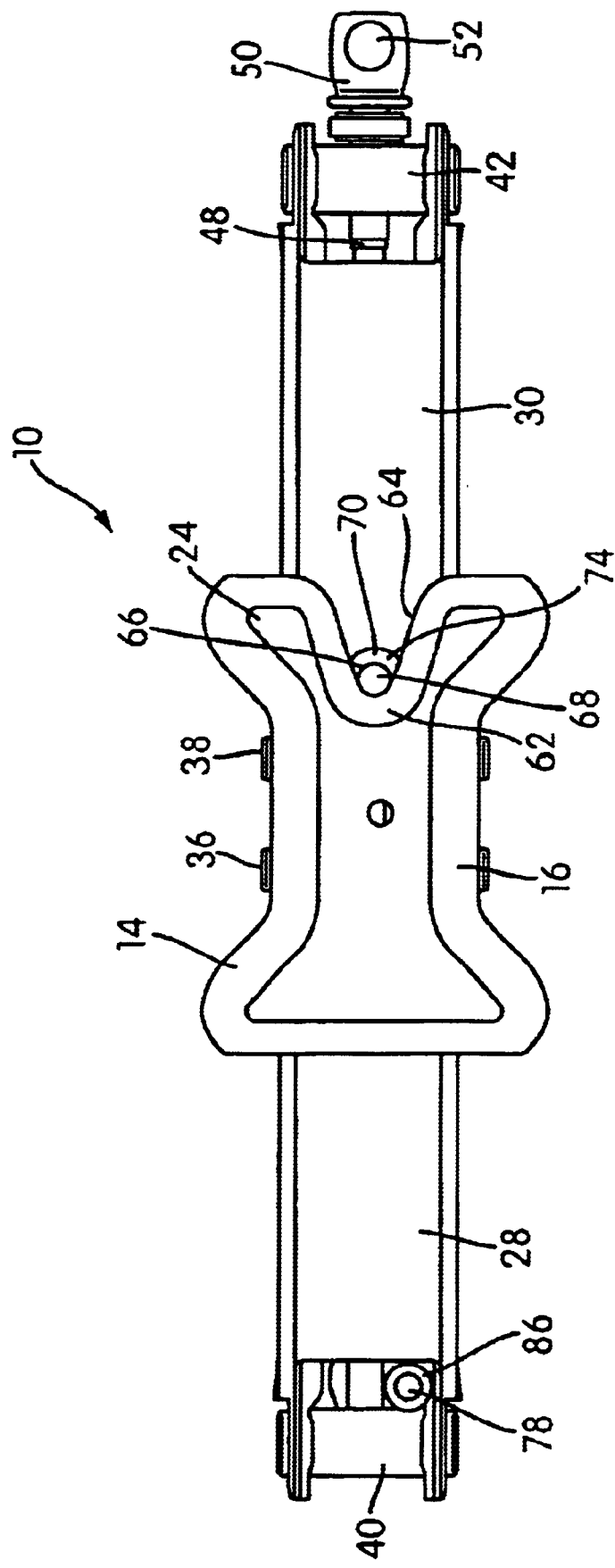
FIG. 4 is a bottom plan view of the jack of FIG. 1 with the structural member of the vehicle omitted to illustrate the manner in which the mounting element and the jack retainer cooperate to retain the jack.

The jack 10 comprises a plurality of assembled structures including a base 14 having a ground engaging surface 16 (FIG. 4) configured for engagement with a ground surface beneath the vehicle when the jack 10 is being used. The assembled structures of the jack 10 also comprise a load rest 18 constructed and arranged to be engaged with structure on an underside of the vehicle. The load rest 10 is stamped from a single metal piece to form an upper wall 20 and two side walls 22 depending downwardly therefrom. The upper wall 20 is recessed in the middle to facilitate stable engagement between the load rest 18 and the underside of the vehicle. The base 14 is also stamped from a single piece of metal and has a bottom wall 24 and a pair of side walls 26 extending upwardly therefrom.

The vehicle jack 10 illustrated is of the pantograph scissors type, and thus its plurality of assembled structures includes four arms 28, 30, 32, 34 interconnected in an articulated manner between the base 14 and the load rest 16. Specifically, the side walls at the lower end of lower arm 28 is connected by a pivot pin 36 inserted through a pair of aligned apertures in the side walls 26 of the base 14. The side walls at the lower end of lower arm 30 is connected by pivot pin 38 through another pair of aligned apertures in the side walls 26 of the base 14. The upper end of lower arm 28 and the lower end of upper arm 32 are pivotally connected to a trunion 40 and the upper end of lower arm 30 and the lower end of upper arm 34 are pivotally connected to a trunion 42. The upper end of upper arm 32 is connected by a pivot pin 44 inserted through a pair of aligned apertures in the side walls 22 of the load rest 18 and the upper end of upper arm 34 is connected by a pivot pin 46 inserted through another pair of aligned apertures in the side walls 22 of the load rest 18.

Trunion 42 has a bore formed therethrough which is threaded internally. A threaded drive screw 48 is threadingly received in the bore of trunion 42. One end of the drive screw 48 provides a drive element 50 to which a manual input force is applied. The input element has an opening 52 into which a jack tool (not shown) is inserted to enable the user to apply manual torque for purposes of rotating the drive screw 48. The opposite end of the drive screw 48 is rotatably received in trunion 40 and locked therein against axial movement. As a result of this construction, rotation of the drive screw 48 causes trunion 42 to move axially along the drive screw 48 towards and away from trunion 40. This in turn causes a translation of the input force wherein the arms 28, 30, 32, 34 pivot in an articulating manner to affect upward and downward movement of the load rest 16 relative to the base, which affects respective raising and lowering movements of the vehicle when the jack 10 is in use. The lower ends of arms 28, 30 have a pair of intermeshed gear portions 54, 56 integrally formed therewith and the upper ends of arms 32, 34 have also have a pair of intermeshed gear portions 58, 60 integrally formed therewith. The intermeshed gear portions synchronize the pivoting movement of the arms to ensure that the load rest 14 is maintained in parallel relation to the base during the raising and lowering movements.

The arms 28, 30, 32, 34, the drive screw 48, input element 50, and trunions 40 and 42 may be considered to constitute a raising and lowering mechanism, which is considered to be part of the plurality of assembled structures of the vehicle jack 10. In the broader aspects of the present invention, the raising and lowering mechanism may be of any type suitable for affecting the relative movement between the load rest and the base and the exemplary embodiment disclosed herein is not intended to be limiting.

In the broader aspects of the present invention, the jack 10 may of any type with any suitable construction and the exemplary embodiment disclosed herein is not intended to be limiting. For example, the jack 10 may be of the half-scissors type wherein only a pair of pivoting arms are utilized.

In the embodiment of FIGS. 1–4 the bottom wall 24 of the base 14 has an edge portion 62 with a U-shaped recess 64 formed therein. The recess 64 is formed during the stamping operation that forms the base 14. The recess is formed inwardly from the edge portion 62 to an extent that is somewhat longer that its width at the opening. In the embodiment illustrated, the inward extent of the recess 64 is about 1.5 to 2 times its width at the opening. The configuration of the edge portion 62 and the recess 64 can be best appreciated from FIG. 3.

The vehicle's structural member 12 has a mounting element 66 extending directly therefrom. In the illustrated embodiment, the mounting element 66 is a threaded shoulder bolt threaded in fixed relation into an aperture on the structural member 12. The mounting element 66 includes a post member 68 extending directly from the structural member 12 and a flange 70 extending outwardly from the end of the post member 68 and providing a jack engaging surface facing generally towards the structural member 12. The flange 70 is positioned in spaced relation from the structural member 12 so that the jack engaging surface of the flange 70, the post member 68, and the structural member 12 define a jack receiving space 74 therebetween. The mounting element 66 may be formed intergrally with the structural member 12; securely threaded into a bore in the structural member 12; or formed or attached in any suitable manner.

The structure providing the jack engaging surface may take any form. For example, the jack engaging surface could be provided by a groove formed inwardly on the mounting element. Specifically, the jack engaging surface would be that surface facing generally towards the structural member 12 and the post member would be that portion of the mounting element received in the jack's recess 64. The remainder of the jack receiving space would then be defined by either the structural member 12 or a surface spaced from the jack engaging surface.

The vehicle's structural member 12 also has a jack retainer 76 that cooperates with the mounting element 66 in a jack retaining position to maintain the jack 10 in its stored position. As will be discussed below, the jack retainer 76 is also movable to a jack releasing position to enable the jack 10 to be removed from the stored position. In the illustrated embodiment, the jack retainer 76 comprises a threaded rod 78 extending directly from the structural member 12 and a locking member 80 with an internal threaded bore threaded onto the rod 78. The locking member 80 has a cone-shaped camming surface 82 and a pair of projections 84 for facilitating manual turning of the locking member 80. Due to the threaded engagement, rotation of the locking member 80 causes it to move axially along the rod 78 towards and away from the structural member 12. The end of the rod 78 the locking member 68 defines a mounting portion 81. The mounting portion is received in an aperture in the structural member 12 and is welded in place to secure the same.

Arms 28 and 32 of the vehicle jack 10 define a rod receiving opening 86 extending therethrough. Specifically, the opening 86 is bounded on one lateral side by the arms 28, 32 and one the opposite lateral side by the drive screw 48. The opening 86 is configured to be moved over and along the rod 78 when positioning the jack 10 in its stored position. The opening 86 is only slightly wider in its lateral direction than the rod 78 to substantially prevent lateral movement of that end of the jack 10 generally parallel to the structural member 12. However, the opening 86 is slightly oversized in the direction extending towards the mounting element 66, namely the longitudinal direction of the jack 10. This enables limited relative movement of the jack 10 towards and away from the mounting element 66 when the locking member 80 is disengaged from the jack 10. As will be discussed in further detail below, this limited relative movement allows the edge portion 62 to be moved into and out of the jack receiving space 74 while received on the rod 78.

To mount the vehicle jack 10 in its stored position, the user positions the jack 10 in its stored position directly adjacent said structural member In the illustrated embodiment, positioning the jack in the stored position thereof comprises engaging the ground engaging surface 16 of said base 14 with the structural member 12 and moving the jack receiving opening 86 over and along the rod 78. Then., the edge portion 62 is positioned in the jack retaining space 74 defined between said flange 70 and the structural member 12 of said vehicle such that the post member 68 is received in the recess 64. This is accomplished in the illustrated embodiment by moving the jack 10 relative to the rod 78 as accommodated by the rod receiving opening 86 being oversized with respect to the rod 78.

Then, the jack retainer 76 is moved to a jack retaining position wherein the jack retainer 76 engages the arms 28, 32, particularly the upper arm 28, to substantially prevent the jack 10 from moving away from the mounting element 66 to thereby maintain the edge portion 62 in the jack receiving space 74. As a result, the flange 68 and the jack retainer 76 cooperate to substantially prevent the jack 10 from moving away from the structural member 12 and the jack retainer 76 and the post member 68 in cooperation with the recess 64 substantially prevent the jack 10 from moving generally parallel to the structural member 12. The jack retainer 76 may be used to engage any other portion of the jack 10 to retain the same in the stored position and the invention is not limited to the arms. However, the illustrated arrangement is considered advantageous because it takes advantage of the opening 86 which is typically present in the design of a scissors jack, thus eliminating the need for modification to provide the opening 86.

In the illustrated embodiment, moving the jack retainer 76 to the jack retaining position thereof comprises moving the locking member 80 rotationally and axially along the rod 78 toward the structural member 12 such that the arms 28, 30 of the jack 10 are positioned between the locking member 80 and the structural member 12. As a result, the aforesaid cooperation between the flange 70 and the jack retainer 76 to substantially prevent the jack 10 from moving away from the structural member 12 is accomplished by both the flange 74 substantially preventing the edge portion 62 from moving away from the structural member 12 and the locking member 80 substantially preventing the arms 28, 32 from moving away from the structural member 12. Also, the aforesaid cooperation between the jack retainer 76 and the post member 68 to substantially prevent the jack 10 from moving generally parallel to the structural member 12 is accomplished by both the edge portion 62 engaging the post member 68 to substantially prevent movement of the base 14 generally parallel to the structural member and the surfaces of the arms 28,32 and the drive screw 48 defining the rod receiving opening 86 engaging the rod 80 to substantially prevent movement of the arms 28, 32 generally parallel to the structural member 12. Specifically, the rod 86 substantially prevents the jack 10 from pivoting about the post member 68 and the post member 68 substantially prevents the jack 10 from pivoting about the rod 78.

The camming surface 82 of the locking member 80 is configured such that, as the locking member 80 is moved axially along the rod 78 towards the jack 10, the camming surface 82 engages the upper one of the jack arms 32 and forces the jack 10 toward the mounting element 66 to provide secure engagement between the post member 68 and the edge portion 62 of the base 12.

It should be understood that the jack retainer 76 may have any construction suitable for retaining the jack 10 in its storage position in cooperation with the mounting element 66. For example, the jack retainer could be designed to simply push the jack 10 towards the mounting element 66 to provide secure engagement. The retainer could thus be provided with a deformable material to assist in frictionally preventing movement of the jack 10 in cooperation with the mounting element 66.

To remove the jack 10 from its stored position for usage in raising the vehicle, the user rotates the locking member 80 so as to move it axially along and off the end of the rod 78. Then, the user shifts the jack 10 to withdraw the edge portion 62 from the jack receiving space 74. Then, the user moves the jack 10 away the structural member 12 and off the rod 78. After usage, the user can replace the jack 10 back in its stored position in the manner described above.

Figure 5:
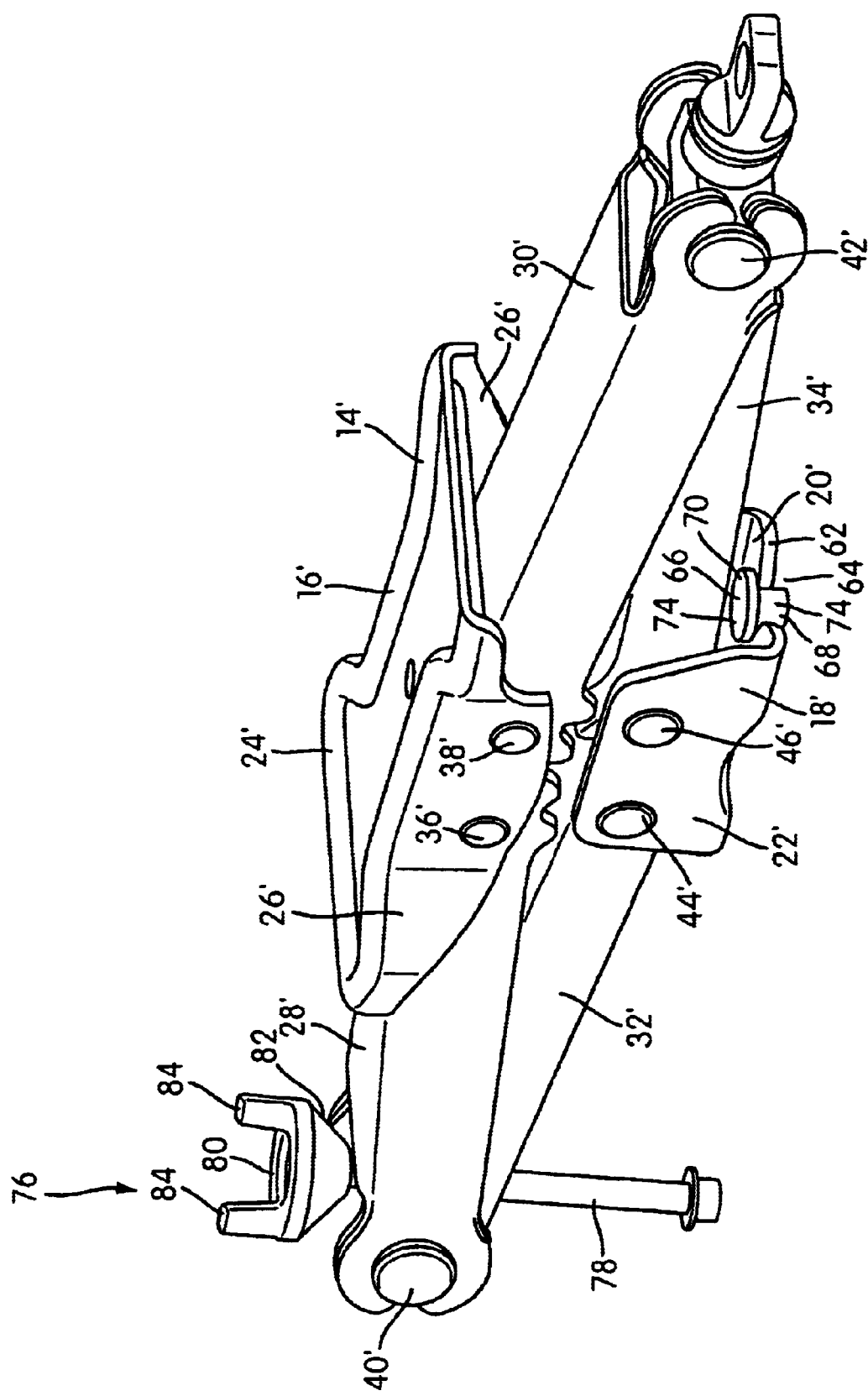
FIG. 5 is a perspective view of an alternative embodiment of the present invention.
Figure 6:
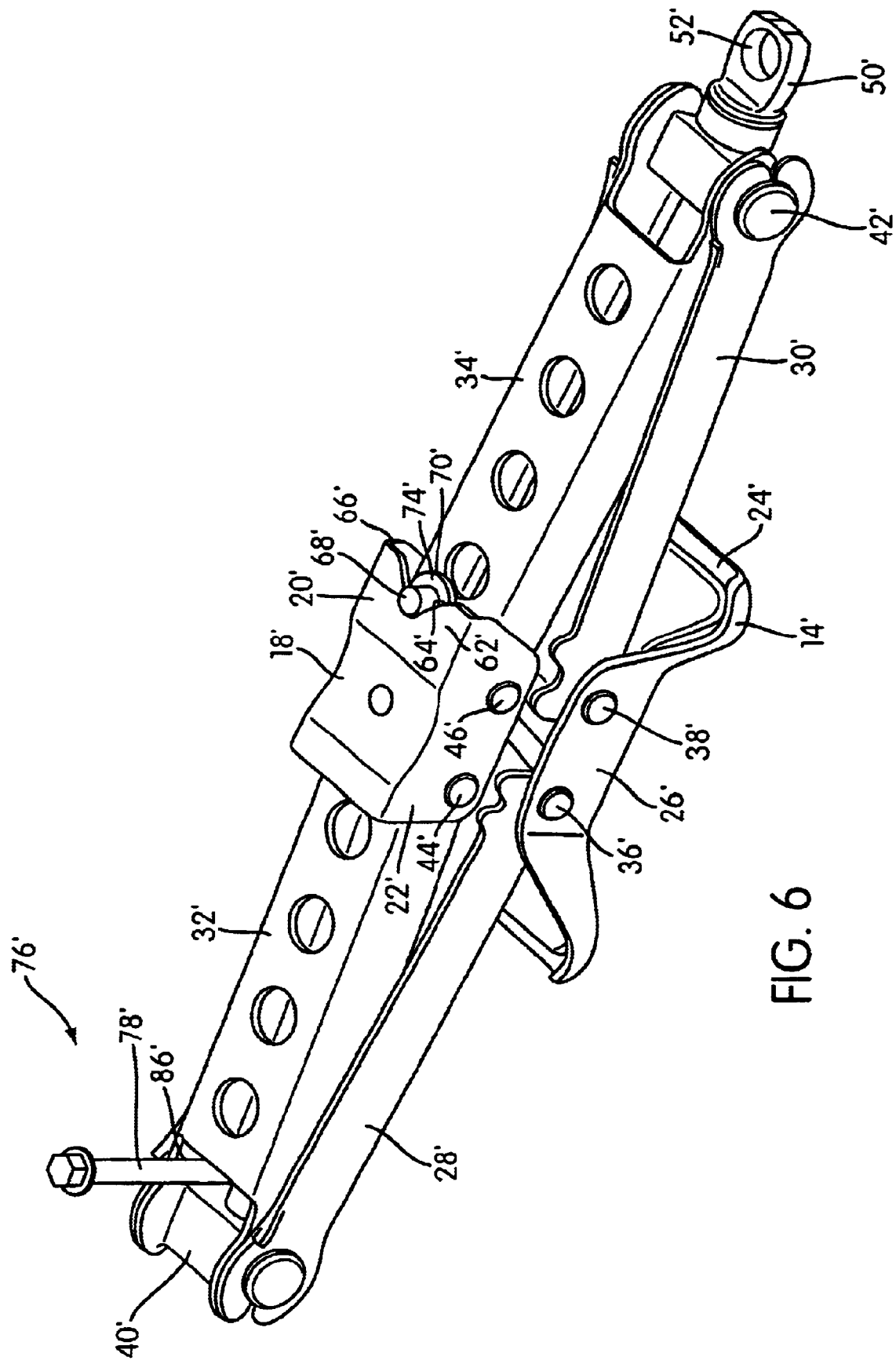
FIG. 6 is a perspective view of the alternative embodiment illustrated in FIG. 5 taken from a different perspective.

FIGS. 5 and 6 disclose an alternative embodiment of the present invention. In FIGS. 5 and 6, the structural arrangement is basically the same as that shown in FIGS. 1–4, except that the edge portion 62' and its recess 64' are provided on the load rest 18' instead of the base 14'. Thus, the same references numerals are used to refer to the same structures, except that a ' is used to differentiate between the two embodiments.

It should be understood that the edge 62 and the recess 64 could be provided on any one of the assembled structures of the jack 10. The base 14 is the preferred location because its ground engaging surface 16 is already designed to be engaged with a flat surface, which is typical of the types of structural members 12 to which the jack 10 would normally be mounted. The load rest 18' is also a preferred location for the edge portion 62 and the recess 64 because it likewise has a flat upper surface suitable for engagement with the structural member 12. However, the broadest aspects of the invention are not intended to be limiting to such arrangements.

It can thus be appreciated that the objectives of the present invention have been fully and effectively accomplished. It should be understood the embodiment illustrated is provided solely for the purposes of disclosing the structural and functional principles of the present invention and is not intended to be limiting.

What is claimed:

1. A method for mounting a vehicle jack in a stored position on a motor vehicle without the use of an intervening bracket;
    said jack comprising a plurality of assembled structures including (a) a load rest for engagement with an underside of the vehicle, (b) a base having a ground engaging surface for engagement with a ground surface below the vehicle, and (c) a raising and lowering mechanism having a drive element constructed and arranged to have an input force applied thereto, said raising and lowering mechanism being constructed and arranged to translate the input force applied to said drive element into upward and downward movement of said load rest relative to said base for affecting respective raising and lowering movements of the vehicle relative to the ground surface, at least one of said assembled structures having a recess formed on an edge portion thereof;

said motor vehicle comprising a vehicle body including (a) a structural member to which said vehicle jack is to be mounted, (b) a mounting element having a post member extending directly from said structural member and a jack engaging surface extending from said post member and facing generally towards said structural member, said jack engaging surface and said post member at least in part defining a jack retaining space, and (c) a releasable jack retainer constructed and arranged to cooperate with said mounting element to retain said jack on said structural member;

said method comprising:

positioning said jack in said stored position directly adjacent said structural member of said vehicle;

positioning said edge portion in said jack retaining space such that said post member is received in said recess; and moving said jack retainer to a jack retaining position wherein said jack retainer engages another portion of said jack spaced from said edge portion to substantially prevent said jack from moving away from said mounting element to thereby maintain said edge portion in said jack receiving space so that (a) said jack engaging surface and said jack retainer cooperate to substantially prevent said jack from moving away from said structural member of said vehicle and (b) said jack retainer and said post member in cooperation with said recess substantially prevent said jack from moving generally parallel to said structural member.

2. A method according to claim 1, wherein said jack engaging surface is provided on a flange extending from said post member in spaced relation to said structural member so that said structural member, said jack engaging surface provided on said flange, and said post member define said jack retaining space;

said positioning said edge portion in said jack retaining space comprising positioning said edge portion between said flange and said structural member.

3. A method according to claim 2, wherein moving said jack retainer to said jack retaining position comprises moving said jack retainer generally towards said structural member such that said another portion of said jack is positioned between said jack retainer and said structural member so that the aforesaid cooperation between said flange and said jack retainer to substantially prevent said jack from moving away from said structural member is accomplished by both said flange substantially preventing said edge portion from moving away from said structural member and said jack retainer substantially preventing said another portion from moving away from said structural member.

4. A method according to claim 3, wherein said edge portion with said recess is provided by the base of said jack and wherein positioning said jack in said stored position thereof directly adjacent said structural member of said vehicle comprises engaging the ground engaging surface of said base with said structural member.

5. A method according to claim 4, wherein said jack retainer comprises a threaded rod extending directly from said structural member and a locking member threaded on said rod for rotational and axial movement along said rod towards and away from said structural member, and said raising and lowering mechanism comprises a pair of articulating arms interconnecting said base to said load rest, said arms constituting said another portion of said jack and defining a rod receiving opening oversized with respect to said rod to accommodate limited relative movement between said jack and said rod; said method further comprising:

while positioning said jack in said stored position thereof, moving said jack receiving opening over and along said rod;

wherein positioning said edge portion in said jack retaining space comprises moving said jack relative to said rod as accommodated by said rod receiving opening being oversized with respect to said rod; and wherein moving said jack retainer to said jack retaining position comprises moving said locking member rotationally and axially along said rod toward said structural member such that said arms of said jack are positioned between said locking member and said structural member so that (a) the aforesaid cooperation between said flange and said jack retainer to substantially prevent said jack from moving away from said structural member is accomplished by both said flange substantially preventing said edge portion from moving away from said structural member and said locking member substantially preventing said arms from moving away from said structural member and (b) the aforesaid cooperation between said jack retainer and said post member to substantially prevent said jack from moving generally parallel to said structural member is accomplished by both said edge portion engaging said post member to substantially prevent movement of said base generally parallel to said structural member and the surfaces of said arms defining said rod receiving opening engaging said rod to substantially prevent movement of said arms generally parallel to said structural member.

6. A method according to claim 5, wherein said locking member has a camming surface that extends radially and axially with respect to said rod and wherein moving said locking member rotationally and axially along said rod toward said structural member such that said arms of said jack are positioned between said locking member and said structural member causes said camming surfaces to engage an upper one of said jack arms and force said jack toward said mounting element to provide secure engagement between said post member and said edge portion of said base.

* * * * *